United States Patent
Duffield et al.

(10) Patent No.: US 7,508,769 B1
(45) Date of Patent: *Mar. 24, 2009

(54) CONSISTENT SAMPLING FOR NETWORK TRAFFIC MEASUREMENT

(75) Inventors: Nicholas G. Duffield, Hoboken, NJ (US); Matthias Grossglauser, Springfield, NJ (US)

(73) Assignee: AT&T Intellectual Property, II, L.P., Bedminster, NJ (US)

( * ) Notice: Subject to any disclaimer, the term of this patent is extended or adjusted under 35 U.S.C. 154(b) by 1042 days.

This patent is subject to a terminal disclaimer.

(21) Appl. No.: 10/839,994

(22) Filed: May 6, 2004

Related U.S. Application Data

(63) Continuation of application No. 09/688,335, filed on Oct. 16, 2000, now Pat. No. 6,873,600.

(51) Int. Cl.
*H04L 12/26* (2006.01)

(52) U.S. Cl. .................................................. 370/252

(58) Field of Classification Search ........................ None
See application file for complete search history.

(56) References Cited

U.S. PATENT DOCUMENTS

| | | | | |
|---|---|---|---|---|
| 5,559,801 A | * | 9/1996 | Lo | 370/412 |
| 5,787,253 A | * | 7/1998 | McCreery et al. | 370/389 |
| 5,790,554 A | * | 8/1998 | Pitcher et al. | 370/471 |
| 6,115,393 A | * | 9/2000 | Engel et al. | 370/469 |
| 6,272,540 B1 | * | 8/2001 | Yadav et al. | 709/223 |
| 6,526,044 B1 | * | 2/2003 | Cookmeyer et al. | 370/352 |
| 6,545,982 B1 | * | 4/2003 | Murthy et al. | 370/245 |
| 6,873,600 B1 | * | 3/2005 | Duffield et al. | 370/252 |
| 6,920,112 B1 | * | 7/2005 | McCloghrie et al. | 370/252 |
| 7,133,400 B1 | * | 11/2006 | Henderson et al. | 370/389 |
| 7,164,657 B2 | * | 1/2007 | Phaal | 370/235 |

* cited by examiner

*Primary Examiner*—Anh-Vu H Ly
(74) *Attorney, Agent, or Firm*—Michael Haynes PLC; Michael N. Haynes

(57) ABSTRACT

Traffic measurement should make it possible to obtain the spatial flow of traffic through the domain, i.e., the paths or trajectories followed by packets between any ingress and egress point of the domain. A method of sampling packet trajectories in a packet switching network allows the direct inference of traffic flows through a measurement domain by observing the trajectories of a subset of all packets traversing the network. A method which assumes that the measurement domain does not change comprises the steps of selecting packets for sampling in accordance with a sampling function of the packet content and generating a practically unique label for each sampled packet. The method does not rely on routing state, its implementation cost is small, and the measurement reporting traffic is modest and can be controlled precisely. Using the same hash function will yield the same sample set of packets in the entire domain, and enables us to reconstruct packet trajectories. An alternate embodiment which assumes no constraints and that the measurement domain may change comprises the steps of applying a sampling function and altering an invariant bit position as a signaling flag in each packet selected for sampling.

24 Claims, 9 Drawing Sheets

FIG. 6

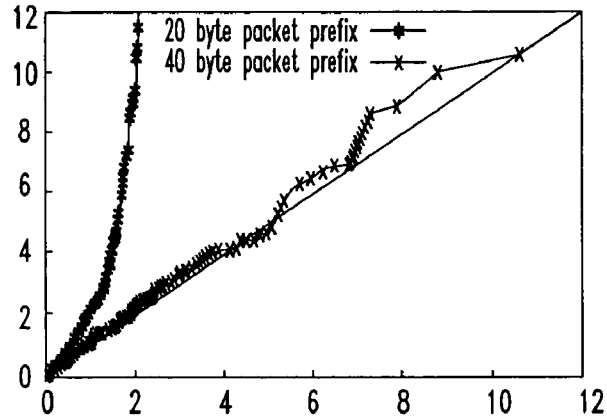

HASH-SAMPLED ADDRESS BITS DISTRIBUTIONS.
Quantile-quantile plot of address bit chi-square values vs. chi-squared distribution with 1 degree of freedom; for various traces, primes $A$, thinning factors $r/A$: see text. Close agreement for 40 byte packet prefixes; marked disagreement for 20 byte packet prefixes (i.e. no payload included for sampling hash)

FIG. 7

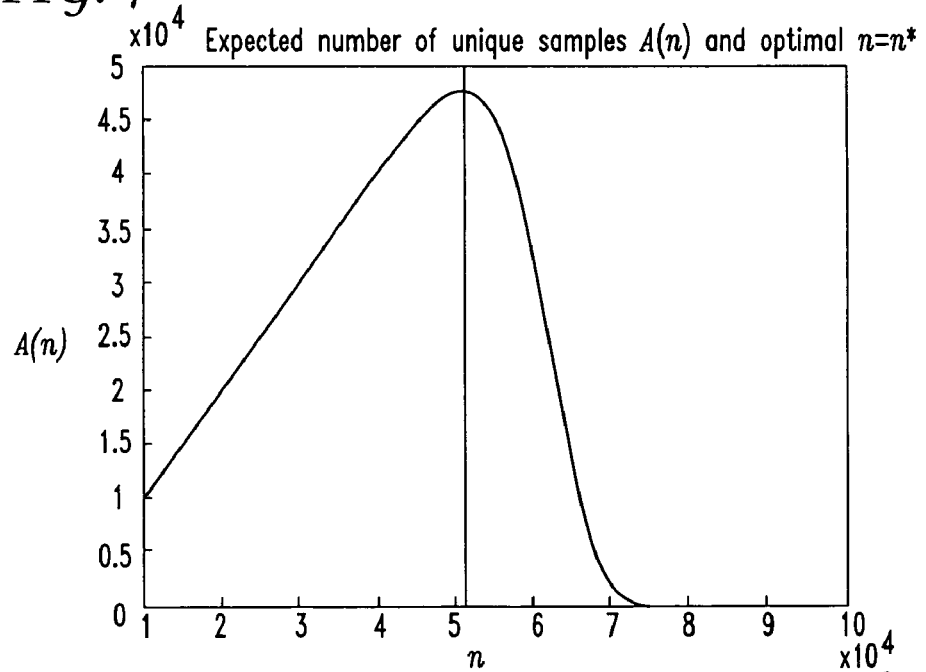

The expected number of unique samples $A(n)$ as a function of $n$, for $c=10^6$ bit. The optimal number of samples $n^*$ is approximately $5.15 \cdot 10^4$, with $m^*=19.4$ bit per label. The collision probability $p_{coll}$ is approximately 0.072, ie., 7.2% of the samples transmitted to the collection system have to be discarded.

FIG. 8

<u>Inference Experiment</u>
- Experiment: inference from trajectory samples
  - Estimate fraction of traffic from customer
  - Customer traffic: small source address subset

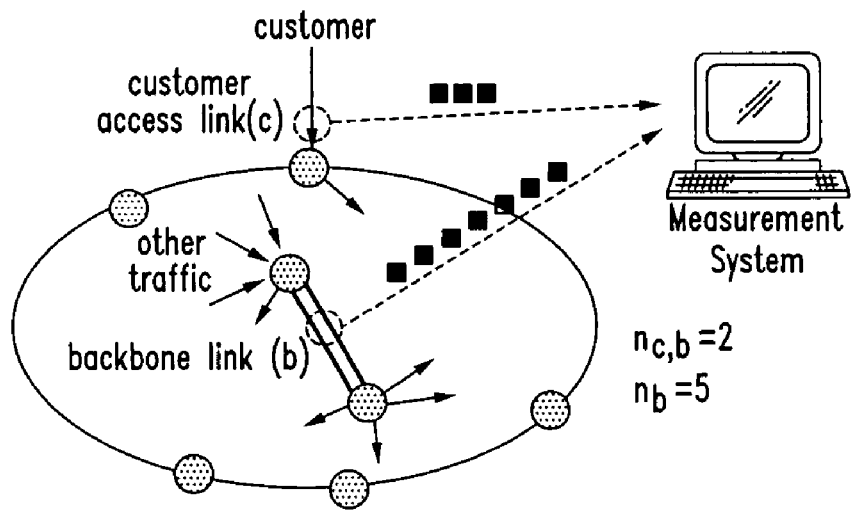

$n_{c,b} = 2$
$n_b = 5$

- Fraction of customer traffic on backbone: $\mu$
  Estimator: $\hat{\mu} = n_{c,b}/n_b$
  $n_{c,b}$: # unique labels common on both links
  $n_b$: # unique labels on backbone link
- Ingress link and source address correlated Estimated Customer Traffic ($c = 10^3$ [bits/epoch])

Estimated Customer Traffic ($c = 10^4$ [bits/epoch])

CONSISTENT SAMPLING FOR NETWORK TRAFFIC MEASUREMENT

CROSS-REFERENCES TO RELATED APPLICATIONS

This application is a continuation of, claims priority to, and incorporates by reference herein in its entirety U.S. patent application Ser. No. 09/688,335, filed 16 Oct. 2000 now U.S. Pat. No. 6,873,600.

BACKGROUND OF THE INVENTION

1. Field of the Invention

The present invention relates to apparatus and a method for direct sampling of traffic in a packet switching network, and, more particularly, to such a method and apparatus for providing "trajectory sampling" or direct sampling of packet data at network traffic points, for example, at packet routers and links in a packet switching network.

2. Description of the Related Arts

Over the years, switched circuit network traffic engineering has become a well known art comprising the steps of measuring traffic over switched circuits in the form of conversation seconds and numbers of calls over periods of time, applying the results to certain probabilistically determined tables, and then installing appropriate facilities and resources in the switched circuit network to match the measured and expected demand. For example, a level of measured traffic over time in a given route between San Francisco and Los Angeles, Calif. is measured and provided to traffic engineers. The traffic engineers then apply a forecasting model to predict the number of circuits required to meet expected demand, and the facilities and resources are routinely provided to meet the expected demand as a function of the telephone company's ability to install and provision the new circuit facilities and resources.

In a packet data telecommunications switching network, these historic approaches cannot be applied because a packet at a point of entry in the network, denoted herein an ingress node, can take any number of possible routes to reach its destination. Moreover, packet switching networks typically provide for duplication of a packet, for example, for multicasting, so that a packet upon network entry is duplicated and delivered to multiple points of egress, each denoted herein an egress node. Moreover, a packet may be lost in a network, never reaching its destination due to expiration of its time to live. There remains a need in the art for improved methods of measuring traffic in a packet switching network, for example, the Internet, a local or wide area data network, an asynchronous transmission mode (ATM) network, cell relay or frame relay network or other types of packet switching networks so that an appropriate number of resources may be determined and provisioned consistent with the result of prior art techniques.

Clearly, the efficiency of resource allocation and the quality of service provided by such packet switching networks, including the Internet, depends critically on effective traffic management. Traffic management consists of short-term traffic control and longer-term traffic engineering. Traffic control operates on a time-scale of seconds and without direct human intervention. Examples of traffic control functions include congestion control, automatic recovery in case of link or router failures, or admission control. Traffic engineering operates on time-scales from minutes to weeks or months, and typically with some degree of human intervention. The goal of traffic engineering in either a packet switching network environment or a switched circuit network environment is the same, to optimally allocate network resources, such as link capacity and router capacity, to different classes of network traffic in order to ensure good service quality and high network efficiency. Examples of traffic engineering functions include traffic characterization (e.g., trending), accounting (e.g., for pricing), and capacity planning and provisioning.

All of these traffic management functions represent feedback loops on a wide range of time-scales and of varying spatial extent, and traffic observation or measurement is therefore an integral component of these functions. The importance of traffic measurement capabilities is compounded by the fact that packet networks such as IP networks do not maintain per-flow state. By contrast, in circuit-switched networks, the traffic is essentially "observable for free", because per-call state exists along each node on the call's path. In a sense, the scalability of the stateless IP networks has been bought at the expense of observability.

Virtually all traffic control and traffic engineering functions, such as route optimization or planning of failover strategies, rely on an understanding of the spatial flow of traffic through the measurement domain. For example, suppose we observe that some link in the backbone network portion of an overall packet switching network is overloaded. Appropriate corrective action requires an understanding of which ingress nodes the packet traffic observed on this link originates and where it is headed, what customers are affected by the congestion, and what the traffic mix is. Without this information, effective remedies (e.g., rerouting of part of that traffic) cannot be taken.

Also, it should be possible to infer what fraction of traffic entering the measurement domain at a certain ingress node traverses each link in the network, for example to focus on how the traffic of a specific customer flows through the domain, and to diagnose which link might be the reason for a performance problem experienced by that customer. Domain-wide spatial traffic information is also a prerequisite for the establishment of label-switched tunnels, or to decide which potential ingress point is best to connect a new customer to the domain.

We distinguish between direct and indirect measurement methods. Conceptually, an indirect measurement method relies on a network model and network status information to infer the spatial flow of traffic through the domain. For example, suppose that the traffic is observed only at network ingress points (e.g., by computing statistics on the distribution of source-destination pairs). In order to infer how that traffic flows through the domain, timely and accurate information about the state of the routing protocol and link states has to be available. If assumptions about traffic routing have to be made in order to obtain the traffic flow matrix, then the use of an outdated routing table can lead to erroneous inferences, and suboptimal allocation of network resources.

More generally, indirect measurement methods suffer from the uncertainty associated with the physical and logical state of a large, heterogeneous network. This uncertainty has several sources. First, the exact behavior of a network element, such as a router, is not exactly known to the service provider and depends on vendor-specific design choices. For example, the algorithm for traffic splitting among several shortest paths in OSPF is not standardized. Second, there are deliberate sources of randomness in the network to avoid accidental synchronization, e.g., through active queue management disciplines or randomized timers in routing protocols. Third, some of the behavior of the network depends on events outside of the control of the domain; for example, how traffic is routed within an autonomous system (AS) depends in part on the dynamics of route advertisement to this AS by neighboring domains. Fourth, the interaction between adaptive schemes operating at different time-scales and levels of locality (e.g., quality of service (QoS) routing, end-to-end congestion control) may simply be too complex to characterize and predict. Finally, with increasing size and complexity, the likelihood increases for faults and misconfigurations to disrupt the normal operation of the network. Often, traffic measurement is one of the potential tools to detect and diagnose such problems; however, this benefit is mitigated if traffic measurement requires correct network operation.

A direct method does not rely on a network model and an estimation of its state and its expected behavior. Rather, it relies on direct observation of traffic at multiple points in the network. As such, it does not suffer from the sources of uncertainty discussed above. In this paper, we describe a direct method for traffic measurement, called trajectory sampling. The method samples packets that traverse each link (or a subset of these links) within a measurement domain. The subset of sampled packets over a certain period of time can then be used as a representative of the overall traffic.

Sampling has been proposed as a method to measure the end-to-end performance of individual flows in connection-oriented packet switching networks such as asynchronous transfer mode networks (ATM). It is known, for example, to sample ATM cells at the ingress and egress points of a virtual circuit in order to measure QoS metrics such as the end-to-end delay and the loss rate. To compute these metrics, cells at the ingress and egress points have to be matched with one another. Clearly, the technique is limited in terms of the data that can be obtained if only the ingress and egress points are utilized although the concept of utilizing a sample function at a point of ingress in a packet switching network is suggested.

There remains a need in the art for a direct sampling technique for a packet switching network which is considerably more flexible and has a greater range of applications than those described by the prior art.

SUMMARY OF THE INVENTION

In accordance with the principles of the present invention, a method of sampling packet switching network traffic over links of a packet switching network comprises the steps of sampling packets at network traffic points, for example, as a function of packet content and generating a packet label for each sampled packet. We term this sampling technique trajectory sampling a goal of which is statistical inference of network traffic based on a sampled subset of packets. The sampled subset should be statistically representative of the overall traffic. In particular, whether a given sampling function is statistically representative depends upon a) the content of the packets varying sufficiently so that perfectly identical packets are very rare and b) the sampling has to appear as random as possible. These objectives can be accomplished by randomly selecting packets for sampling (i.e. a sampling flag embodiment discussed below) or a sampling and label generating process among other processes that could be designed consistent with the principles set forth herein.

By packet switching network is intended any network for routing or switchably routing packets of data comprising fixed or variable numbers of variant and invariant data. Some examples include the Internet, local packet data networks, wide area packet networks, asynchronous transfer mode networks, frame relay networks, cell relay networks and hybrid networks. In a sampling and labeling embodiment, a hashing function is used for determining packets for sampling based on packet content. While an elementary unit such as a packet is used by way of example, the present invention may be extended to flows of packets and other multi-packet data carriers such as e-mails or encapsulated or tunneled packets.

This sampling and label generating embodiment assumes that no changes to a packet switching network, and in particular, to the packet protocol need be performed. A packet header for example, presently has no available field or predetermined bit position permitting any sampling flag setting or the like use of its component bits.

In this sampling and label generating embodiment, the generated packet label and packet header data, a time stamp or other parameters are forwarded to a measurement system which may be local to a router or link or other network traffic points at which the sampling method is practiced, typically an edge router, or to a measurement system at another network traffic point. At an intermediate point or an egress point, only the label need be forwarded to the measurement system assuming already detected parameters have not changed or a time stamp and/or the data in the time to live field may be sent additionally with the label. A time stamp, in order to reduce ambiguities, need not be generated by a perfectly synchronized network clock but should be sufficiently accurate to permit reasonably high resolution choices to reduce ambiguities between possible trajectories in relation to the measurement period. A time-to-live field is somewhat of a misnomer as to providing a substitute for a time stamp but may be useful in resolving ambiguities. Consequently, a measurement system may determine the path of a packet through the network, whether the packet is lost or reaches an egress node and the like from the reporting traffic network points and the packet labels.

Preferably, all routers in a packet switching network are equipped with apparatus for applying a sampling function to incoming packets that are new to the network. Those that have already passed through an ingress node can also be determined by the label that has been forwarded to them. During a measurement interval, the label is preferably practically unique and can be stored in a base measurement system memory along with any measured parameters or extracted data. For example, each label can be forwarded to a base system with a time stamp, the packets destination and source, packet length or any other measured parameter or data. Any form of measurement system may be applied over this direct sampling technique which we refer to as trajectory sampling. Trajectory sampling permits following the flow of a packet through a packet switching network through the branches of its trees to its singular or plural points of egress or to its loss in the network, for example, due to a time-to-live expiration.

In another preferred embodiment of trajectory sampling, a change to a packet switching protocol is tolerated, for example, to permit the modification or altering of a bit at a known location of a field within a packet or in a header field of an encapsulating packet to identify that the free or encapsulated packet has been selected for sampling at an intermediate traffic measurement point or at a point of egress. Thereafter, at any network traffic point in that packet's path through the network, the modified bit, a sampling flag, can be detected and if set, identify the packet for measurement at the network traffic point. In this sampling flag embodiment, the decision to sample may be based on a probabilistic method, on a specific packet property, on a customer's needs or any other reasonable condition. Whether a bit is set in a predetermined position as just suggested or some other means is utilized to signal to a traffic measurement point that a given packet has been selected for sampling and measurement, the important aspect of this embodiment is that the decision to sample is conveyed within or along with the packet to every node and link traversed by the packet selected for sampling.

There are several means to implement the sampling flag embodiment. In stead of a single predetermined bit, a field in a packet header can be used. For example, while there may be no spare bits in an IP version 4 header, there are more likely going to be opportunities for such a sampling flag bit in an IP version 6 or later version header, still under development. Moreover, a vendor may choose to not implement a given header field and utilize such a field, such as the type of service field, or one predetermined bit thereof as a sampling flag. Moreover, a vendor might encapsulate a packet and utilize a header of the encapsulated packet to locate a sampling flag.

Thus, in accordance with a further aspect of the present invention, a determination of a sampling function may be considered separately from the determination of what to do after a packet has been selected for sampling. In one sampling and label generating embodiment described in brief above, a practically unique label is generated for the packet for transmission to a measuring system along with determined parameters for storage and further processing. In an alternate sampling flag embodiment as described above, a certain predetermined bit may be intentionally altered to signal a measuring point that this packet has been previously selected as a packet to be measured at that point.

Finally, the measurements taken after direct or trajectory sampling is applied may be treated as a separate invention. For example, in the sampling and label generating embodiment, parametric data is collected at a point of ingress but only the label and perhaps a time stamp need be forwarded from any intermediate or point of egress. The kind and quality of data collected and stored is determinative of the quality of traffic management results. For example, if some form of time stamping is not provided by either sending a time stamp from each network traffic point, ambiguities may be difficult to resolve in trajectories. Sending the time-to-live field data may be somewhat helpful in resolving ambiguities but other ways of determining elapsed time may be utilized. Since the packet has entered a measurement domain, it may not be possible to determine the trajectory through the domain among other valuable traffic management inferences such as link delay, router delay and the like. In one example, a customer's traffic contribution to a backbone link is determined using trajectory sampling.

These and other features of the present invention will be explained in view of the following detailed description of the accompanying drawings.

BRIEF DESCRIPTION OF THE DRAWINGS

The present invention will now be described in more detail with reference to preferred embodiments of the invention, given only by way of example, and illustrated in the accompanying drawings in which:

FIG. 6 shows a quintile to quintile plot of address bit chi-square values versus chi-squared distribution with one degree of freedom.

FIG. 7 is a graph showing the expected number of unique samples as a function of the number of samples.

FIG. 8 diagrams a simple experiment to compare the labels from two links to estimate the fraction of traffic on a backbone link coming from a given subscriber.

DETAILED DESCRIPTION

Figure 1:
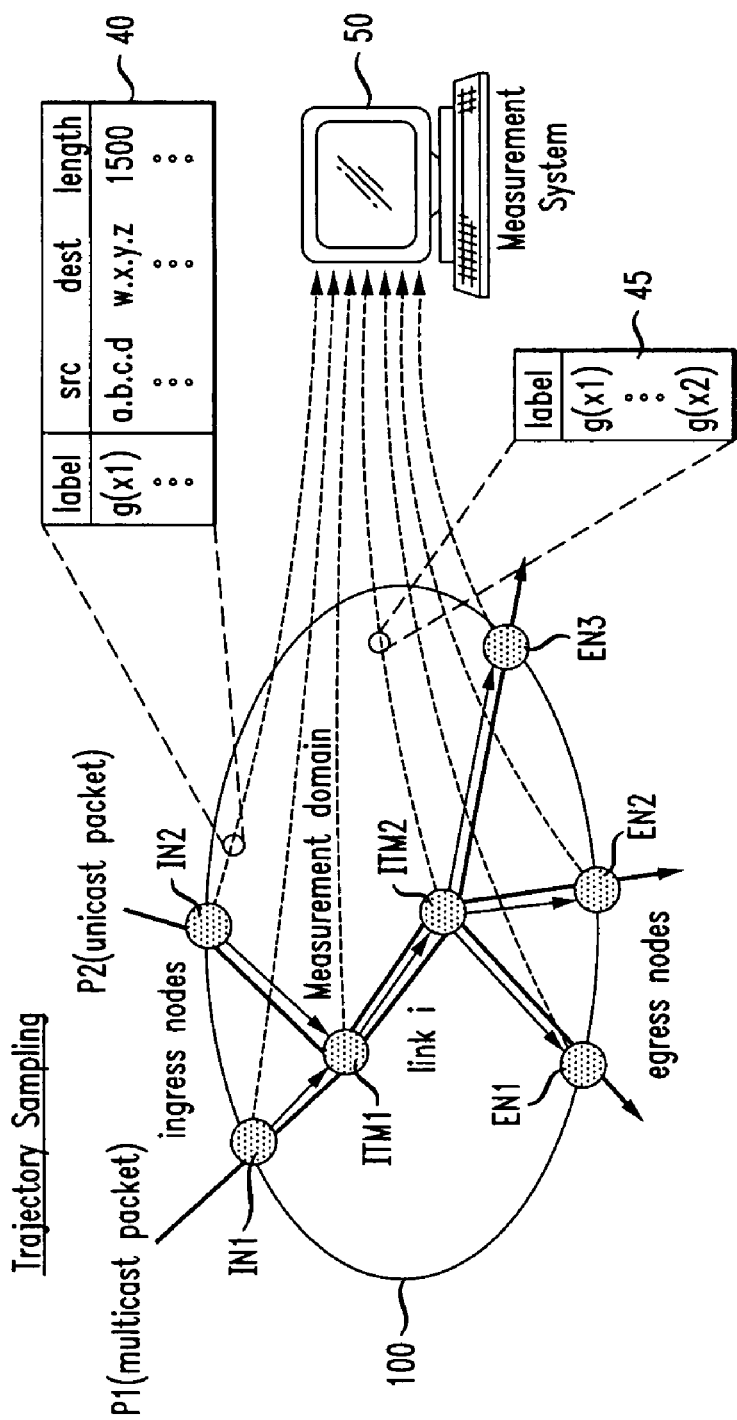
FIG. 1 is a generalized depiction of a packet switching network having a measurement domain, that is, a domain within which packets are to be sampled and measurements taken showing a unicast packet, a multicast packet having paths through the network and their measurement tables gathered by unique label generated as discussed herein and parameters such as source address, destination address and length as examples of parameters passed to a measurement system for storage and subsequent processing.

Referring briefly to FIG. 1, there is shown a traffic management system useful for explaining the principles of the present invention, a trajectory sampling method and apparatus. The traffic management system comprises a measurement domain 100, a plurality of network traffic points comprising ingress nodes, of which only two, IN1 and IN2 are shown, a plurality of intermediate traffic measurement points of which only two, ITM1 and ITM2, are shown, a plurality of egress nodes of which only three, EN1, EN2 and EN3 are shown, two packets, a multicast packet PI and a unicast packet P2, a tabular data collection memory example 40, preferably collected only once, for an ingress point IN2, a label table for an intermediate point ITM2, shown by way of example, and a measurement system 50 to which the data is transmitted. FIG. 1 also show in dashed line form possible paths of the packets PI and P2 through links of the measurement domain 100 between or among nodes. It is important to note that multicast packets PI require no special treatment. A sampling function according to one embodiment of the present invention is implemented at an ingress node IN2, packets are selected for sampling according to a predetermined sampling function and a label may be generated for detecting, storing and formulating data in a table useful for a given measurement period. It should be appreciated that any node may be an ingress node at the same time as the same node is an intermediate node in relation to another packet or an egress node in relation to yet another packet.

The collected data is forwarded in the form of tables 40, 45 to a measurement system 50 at which point traffic control and traffic engineering may be performed on the collected data. Because of the practically unique packet label, data collected at ingress node IN1, IN2, any intermediate point or point of egress among other possible network traffic points may be collected and related to one another during such further traffic measurement and traffic management processing. By way of example, one customer's traffic can be inferred in relation to other traffic on a backbone link.

According to the principles of the present invention, if packets are simply randomly sampled at each link, then one would be unable to derive a precise path that a sampled packet has followed through the network domain 100 from the ingress point IN to the egress point EN. One important principle of one embodiment of the present invention is therefore to base a sampling decision on a deterministic hash function over the packet's content. If the same hash function is used throughout the domain 100 to sample packets, then it follows that a packet is either sampled on every link it traverses, or on no link at all. In other words, we effectively are able to collect trajectory samples of a subset of packets. For a sampled packet, data is collected along its entire trajectory during its period of life or until it leaves at one or more points of egress. The choice of an appropriate hash function is important to ensure that this subset is not statistically biased in any way. For this, the sampling process, although a deterministic function of the packet content, has to resemble a random sampling process.

A second important principle of this same embodiment of the present invention is that of packet labeling, although the packet labeling may be considered a stand-alone invention. To obtain trajectory samples, we are not interested in the packet content per se; we simply need to know that some packet has traversed a set of links to a point of egress or its demise. But to know this, it is sufficient to obtain a unique packet identifier, or label, for each sampled packet within the domain and within a measurement period. Because the label is designed to be unique (for example, to be as short as possible but avoid collisions/matches with identically labeled packets), we will know that a packet has traversed the set of links and routers, hereinafter, network traffic points, which have reported that particular label. We use a second hash function to compute packet labels that are, with high probability, unique within a measurement period. While the size of the packet labels obviously depends on the specific situation, note that labels can in practice be quite small (e.g., 20 bits in length) in relation to a measurement period, for example, on the order of ten seconds. As the measurement traffic that has to be collected from nodes and links in the domain 100 only consists of such labels (plus some auxiliary information), the overhead to collect trajectory samples is small.

Trajectory sampling has several important advantages. It is a direct method for traffic measurement, and as such does not require any network status information. The spatial flow of traffic through the domain can be inferred from trajectory samples, i.e., paths taken by a pseudo-random subset of packets through the domain. Trajectory sampling does not require router state (e.g., per-flow cache entries) other than a small label buffer 45 (for example, to collect labels and send them in an IP packet to a measurement system 50). The amount of measurement traffic necessary is modest and can be precisely controlled. Multicast packets P1 require no special treatment—the trajectory associated with a multicast packet P1 is simply a tree instead of a path. Finally, trajectory sampling can be implemented using state-of-the art digital signal processors (DSPs) even for the highest interface speeds available today.

In the following detailed description of a preferred embodiment, we define notation and formally define trajectory sampling in the following section. We discuss the choice of parameters for the hashing functions and demonstrate their statistical properties in the following section. We give an example of traffic measurement based on an extensive packet trace in a further section. In the next to last section, we discuss implementation issues and possible extensions of trajectory sampling. The last section provides a conclusion.

Description of Trajectory Sampling

For simplicity, let us assume an Internet protocol network, although the principles of the present invention may be applied to any packet switching network, and describe a sampling scheme assuming that all packets are of size S bits, not intending to exclude variable size packets to which the principles of the present invention may be also applied to benefit. We represent the measurement domain as a directed graph G(V, E), where V is the set of nodes and E is the set of directed links. Packets enter the measurement domain 100 at an ingress node IN. They traverse several links to leave the measurement domain at an egress node EN (or several egress nodes in the case of a multicast packet). Strictly speaking, several copies of a multicast packet P1 could enter the measurement domain 100 at multiple ingress nodes; for our purposes, we can simply consider each copy of the multicast packet entering the domain as an independent packet. Also, a packet can potentially be dropped at an intermediate node ITM. We let $x_i(P_k)$ denote the content of a packet k at link i, i.e., the sequence of bits making up the IP header and the IP packet content. When there is no risk of ambiguity, e.g. when considering a stream of packets at a single link, we refer to a packet P and its content $\chi=\chi(P)$ interchangeably.

Consider all the packets $P_1, \ldots, P_N$ entering the domain within a measurement interval of length T. The trajectory of packet $P_k$ is the set of links traversed by packet $P_k$. In the case of a unicast packet P2, the trajectory is a path from the ingress node, for example, IN2, to the egress node or to the node where the packet is dropped. In the case of a multicast packet P2, the trajectory forms a tree rooted at the ingress node IN1.

Referring again to FIG. 1, a measurement system 50 collects packet labels from all the links and network traffic points within the domain, although only one link and table 45 is shown. Labels are only collected from a pseudorandom subset of all the packets traversing the domain 100. Both the decision whether to sample a packet or not, and the packet label, are a function of the packet's invariant content.

The invariance function $\phi$ is a function of the packet content whose output depends of the invariant packet content, i.e., the bits of the packet that are not modified upon forwarding, as described below. An invariance function does not depend, for example, on the TTL field, which is decremented at each hop. Without loss of generality, we assume here that the function $\phi$ simply extracts all the S: invariant bits from the packet.

$$\phi:\{0,1\}^S \to \{0,1\}^{S_c} \quad (1)$$

A principle of trajectory sampling according to one embodiment of the present invention is to decide whether to sample a packet P based on a deterministic function of the invariant packet content $\phi(\chi(P))$; we call this deterministic function the sampling hash function h, defined as $$h:\{0,1\}^{S_c} \to \{0,1\}. \quad (2)$$

A packet P is sampled if $h(\phi(\chi))=1$. Note that we use the same sampling hash function h on each link and at each sampling node in the measurement domain 100. In this way, a packet is either sampled everywhere on its trajectory or not at all, and the sample data lets us reconstruct the trajectories of the sampled packets.

In principle, a given node, link or other network traffic point practicing the present invention could send the entire content of a sampled packet to the measurement collection system 50. However, this is very inefficient; note that to identify trajectories, we are not interested in the content of the packet per se, we only need an identifier to distinguish a given packet from other sampled packets, in order to obtain unambiguous samples of packet trajectories. Therefore, we use an identification hash function g to compute a compact packet identifier on the constant part of the packet.

$$g: \{0,1\}^{Sc} \rightarrow \{0,1\}^m. \quad (3)$$

In this way, we only have to send m bits per sampled packet per link to the measurement system (collection station) 50.

In its most basic form, trajectory sampling performs the following simple operation at each link in the domain: for each observed packet of content x, if $h(\phi(x))=1$ then send the label $g(\phi(x))$ to the measurement collection system. While this suffices to identify packet trajectories, additional information about a sampled packet (such as its length and its source and destination addresses) are required for many measurement purposes. It is sufficient to collect this additional information once per sampled packet. For example, ingress nodes IN can be configured to retrieve this information along with the labels, while all other nodes such as intermediate and egress nodes only collect labels (see FIG. 1). On the other hand, time stamps could be collected and forwarded with labels at ingress, intermediate and egress nodes so that a trajectory tree and link and routing delays can be particularly determined as a sampled packet traverses the measurement domain 100. As an alternative to a time stamp, the time to live field could be forwarded with the label as a practical equivalent to a time stamp.

Figure 2:
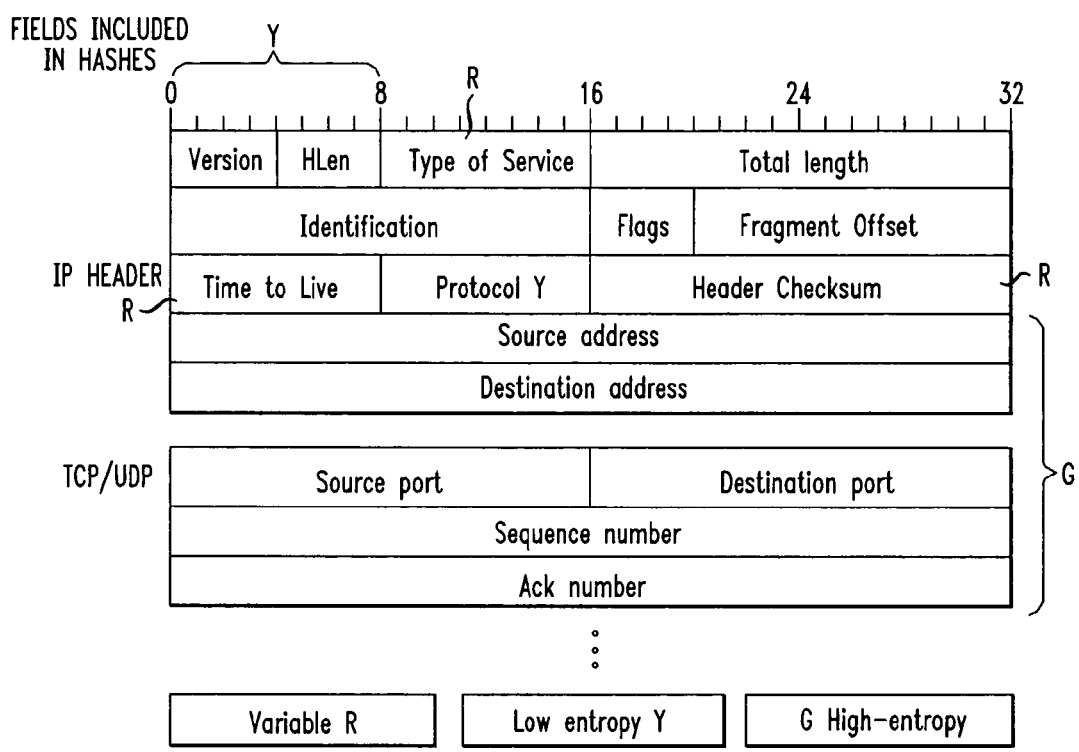
FIG. 2 provides an exemplary table of invariable packet content found in the TCP/UDP protocol by was of example and without any limitation to the present invention.
Figure 3A:
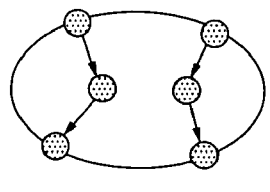
FIG. 3 comprises a plurality of paths a) through h) through a network that may be followed by two packets to support a discussion of ambiguity in determining routes through a packet switching network.
Figure 3B:
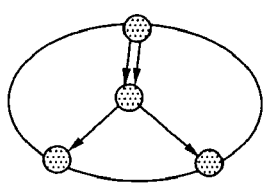
Figure 3C:
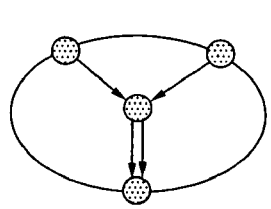
Figure 3D:
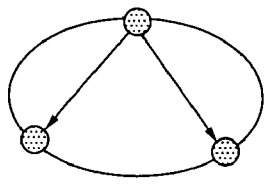
Figure 3E:
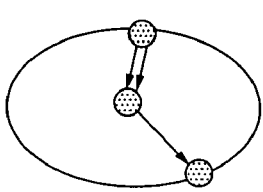
Figure 3F:
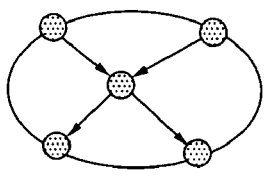
Figure 3G:
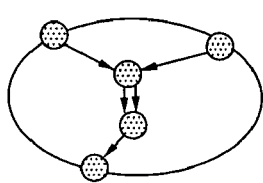
Figure 3H:
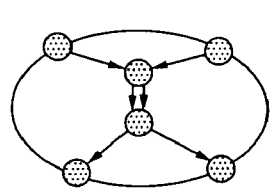

Now, we will discuss packet identity and applying a hash function built around invariant content of the packet. The definition of the invariance function 0 is completed by identification of the invariant packet content. Here we consider only packets in IP version 4, but as earlier explained, the present invention is not so limited to IP packets or any particular packet switching network protocol. We first consider candidate parts of the IP protocol packet with the first 20 bytes of the packet; this comprises the packet header, or the first 20 bytes of a packet with IP options. In FIG. 2, we show variable fields in one shade denoted R, low entropy fields in another shade denoted Y and high entropy fields in a third shade denoted G. We exclude variable fields such as TTL (bits 64-71) which is decremented per hop, and the SERVICE TYPE field (bits 8-15) since certain of its bits may be changed in transit, e.g. during Explicit Congestion Notification, and by operation of Differentiated Services. (On the other hand, a type of service bit, for example, might be utilized as a sampling flag bit by a router vendor according to a second embodiment of the invention to be discussed subsequently herein). The HEADER CHECKSUM (bits 80-95) is recalculated on changes of each of these and must hence also be excluded.

Referring briefly to FIG. 2, there are shown examples of invariant packet content with specific reference to an Internet Protocol packet content. The hash functions are computed over a subset of header fields and part of the payload. Fields that are preferably included are high entropy fields and shaded G. The selection of fields is further discussed below.

Low entropy fields, VERSION (bits 0-3), HEADER LENGTH (bits 4-7) and PROTOCOL (bits 72-79), are either constant or take one of a small number of values; there is little gain in their inclusion in the invariant packet content because there are few bits and there is only some likelihood the bit values change providing low entropy.

Examples of high entropy fields are the SOURCE AND DESTINATION IP ADDRESS (together bits 96-159), which are preferably included in the invariant packet content. We also include the IDENTIFICATION field (bits 32-47). The presence of tunneling will impact packet identity through encapsulation behind a tunnel header. In some types of tunnel the original header could be recovered from the tunnel payload upon or through appropriate offsetting; for example, in known IP tunneling approaches and in Multiprotocol Label Switching (MPLS). This approach lets us match up samples inside and outside the tunnel. If tunnel endpoints are confined to the network edge, then one can simply sample consistently in the network interior.

FLAGS (bits 48-51) and FRAGMENT OFFSET (bits 52-63) are likewise mutable through fragmentation. Indeed, fragmentation raises potentially a larger issue, since it provides a mechanism by which the notion of a single identifiable packet becomes corrupted. However, we expect fragmentation to by confined to the network edge, with an edge-to-edge notion of packet identity remaining valid. In this case we can include TOTAL LENGTH, FLAGS and FRAGMENT OFFSET within the invariant content.

The remainder of the packet following the first 20 bytes completes the invariant packet content. In certain IP options packets, such as packets with a record route option, these following bytes may change hop by hop. However, since such packets are rare, we believe the effect on sampling can be ignored.

We will now discuss the impact of ambiguous trajectories, where one cannot determine with certainty the trajectory followed by a packet, and, in particular, how to infer trajectories from the labels collected from the network over a measurement period. The measurement period T is chosen as an upper bound of the packet lifetime (e.g., 10 seconds). We assume that all the packet observations made within the same measurement period can only be distinguished by their label, not by their arrival time within the measurement period. As labels are allocated pseudo-randomly to sampled packets, there is obviously a chance of label collision, i.e., of two or more packet trajectories having the same label in the same measurement period. The question we address now is under what circumstances we can disambiguate these trajectories.

It is useful to introduce the concept of a label subgraph associated with a label i and a measurement period. The label subgraph is simply the graph of the network domain, where each link is annotated with the number of times label i has been generated by that link in the measurement period; links with zero are deleted. A label subgraph basically represents the superposition of all the trajectories in the measurement period that had this label.

We restrict the following discussion to unicast packets and to acyclic label subgraphs. Referring to FIG. 3, there are shown examples of unambiguous (a-e) and ambiguous (f-h) label subgraphs, further discussed below. (For (e) and (g), a packet is dropped at an interior, intermediate node.)

First, note that in the trivial case where a label subgraph stems from a single trajectory, that trajectory can always be inferred unambiguously. Intuitively, this is because a packet is either sampled everywhere in the domain or nowhere. Thus, if we observe label i on exactly one inbound and one outbound link of a node, it must be the same packet. We view packets generated by routers (e.g., routing updates) as coming from a virtual ingress node connected to that router. By induction, the entire trajectory can be reconstructed without ambiguity.

Second, let us consider the case where the label subgraph is the superposition of several trajectories. A few examples of superpositions of two trajectories are given in FIG. 3. As can be seen from studying the subgraphs, the examples (a) through (e) are unambiguous, while examples (f) through (h) are ambiguous.

The following property holds: a label subgraph is unambiguous if each connected component of the subgraph is either (a) a source tree, or (b) a sink tree such that for each node on the sink tree, the degree of the outbound link is the sum of the degrees of the inbound links. Note that example (e) is unambiguous because the only connected component is a source tree; it is also a sink tree, but the degree condition does not hold.

Also note that ambiguity as defined here pertains only to the trajectories followed by packets. For example, example (e) is unambiguous because there is no ambiguity about the two trajectories followed by the packets. However, if we have collected other attributes of the two packets (e.g., at the ingress node), then we have no way of knowing from (e) which packet was dropped in the middle, and which one made it to the egress node. In contrast, there are several possible sets of trajectories that can result in the label subgraphs (f) to (h).

Performance of Trajectory Sampling

In this section, we study the performance of trajectory sampling. Our overall goal is to obtain as many pseudo-random trajectory samples from the network as possible, without using too many resources (network bandwidth, memory of collection system 50). We first describe calculation of the hashes. We then demonstrate that the hashes appear statistically independent from the original packet content, thus enabling unbiased sampling. We then compute the optimal choice of the total number of samples to be collected from the network and the number of bits per sample, subject to a constraint on the network bandwidth available for traffic measurement.

We regard the ordered bits of a packet x and of its invariant part $\phi(\chi)$ as binary integers. We use the sampling hash $$h(\phi(\chi)) = \begin{cases} 1 & \text{if } \phi(\chi) \leq r \bmod A \\ 0 & \text{otherwise} \end{cases} \quad (4)$$

for positive integers A and r. The modulus A is chosen in order to avoid collisions arising from certain structural properties of the packet contents. For example, we expect to find complementary sets of packets in which source and destination IP addresses are interchanged, arising from the two way flow of traffic in TCP sessions. The hash function, and hence the modulus, is chosen to avoid collisions in which a pair of packets that differ little by such an interchange are mapped onto the same remainder. Knuth has published an article formulating a condition for avoidance of such collisions, namely that $q^k \pm a \neq 0 \bmod A$ for small a, k where q is a radix of the alphabet used to describe the header. Including $q^k = 2^{32}$ in this criterion suppresses collisions of the type described above. Moduli obeying these conditions can be selected from tables of primes. r determines the granularity of sampling; A must be chosen sufficiently large in order that the smallest available sampling rate, namely 1/A for r=1, is sufficiently small.

The sampling hash function may be applied differently to sections of a domain than to the whole. Assume a situation where link speeds vary in different portions of the domain and/or are very heterogeneous. In such a situation it may be desirable to sample a larger fraction of packets on slow links than on fast links. Yet, it is desirable to ensure that a packet that is sampled on a link with a lower sampling rate is also sampled on any link with a higher sampling rate.

To accomplish this result, one may choose different values of r in equation (4) in the different regions of the domain 100. Any packet sampled in a region where r takes the value r__1 is also sampled in a region where r takes any value r__2 greater than our equal to r__1.

Sampled packets are encoded using a similar hash function $$g(\phi(\chi)) = \phi(\chi) \bmod B, \quad (5)$$

with the modulus B A in order that the identification hash is uncorrelated with packet sampling.

As hashing is a deterministic function, if two packets are exactly identical, then the sampling decision and their label will be identical as well. Therefore, identical packets are not sampled pseudo-randomly by the method of this embodiment, which can lead to biased estimators. We therefore have to convince ourselves that identical packets are rare in practice. We call the occurrence of identical packets in a trace collisions.

More generally, we are interested in the frequency with which a prefix of a certain length l (i.e., the first l invariant bytes) of a packet is not unique within a large set of packets. If we can identify a packet prefix length for which collisions are rare, then it is sufficient to compute the sampling and the identification hash over this prefix. In a sense, the prefix generates sufficient "entropy" to make the sampling and labeling processes look random.

Figure 4:
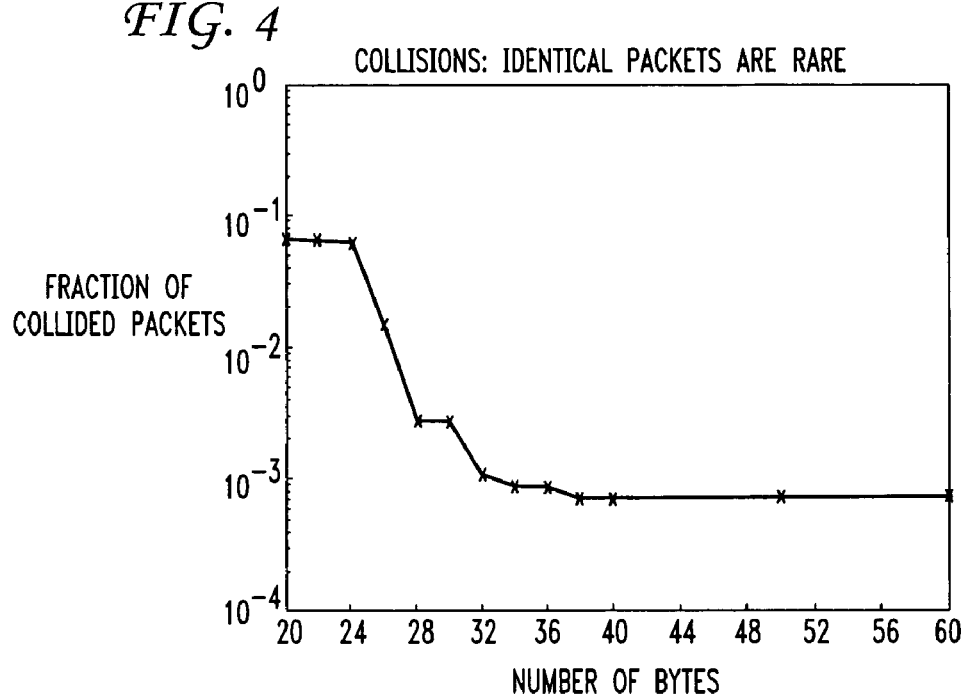
FIG. 4 shows a graph of a number of bytes of the prefix length l of a packet versus a fraction of packets whose prefix is not unique.

We have computed the number of collisions in a trace of one million packets, as a function of the packet prefix length. Referring briefly to FIG. 4: PACKET COLLISIONS, the fraction of packets whose prefix is not unique, as a function of the prefix length l is shown. The smallest value for the prefix length (20 bytes) corresponds to using only the packet header. It is clear that relying only on the packet header is not sufficient for trajectory sampling to work well, as identical headers appear too frequently (l=20 bytes). However, increasing the packet prefix length to take into account a few bytes of the payload quickly decreases the collision probability to below $10^{-3}$. Increasing the packet prefix length beyond about 40 bytes does not reduce collisions any further; the remaining collisions are due to packets that are indeed exact copies of at least one other packet. We note that the majority of these residual collisions are due to TCP duplicate acknowledgment packets, which are indeed exact copies of each other. However, collisions are sufficiently rare to be inconsequential.

We explored the statistical properties of hashing algorithms on packet traces. The traces were gathered using the published-upon tcpdump utility on a host attached to a local area network segment close to the border of a campus network. Analysis was performed on four traces each comprising 1 million IP packets. Except in one case, the traces involved traffic between about 500 distinct campus hosts and about 3000 distinct external hosts. The exception was a trace of a single ftp session set up between two campus hosts.

The hash functions were implemented in 32 bit integer arithmetic by long division over 16 bit words. Thus, a given number $z=(z_k, z_{k-1}, \ldots, z_1)=\Sigma_{i=0}^{k} z_i 2^{16i}$ has its modulus z mod A calculated through the iteration of $$(z_k, z_{k-1}, \ldots, z_0) \bmod A = (z_{k-1} + 2^{16}(z_k \bmod A), \ldots, z_o) \bmod A. \quad (6)$$

Since the word size is 16 bits, $Z_{k-1} + 2^{16}(Z_k \bmod A)$ fits within a 32 bit unsigned integer.

A desirable property of sampling hash function is that packet sampling should appear independent of a proper subset of the packet content. Consequently, the distribution of any variable attribute of the packet (such as source or destination IP address) should be the same for sampled packets as for the original population. We now perform tests of the independence hypothesis, based on chi-squared statistics calculated from the samples and the original traces.

Consider a given attribute of the packet (or set of packets), e.g. destination IP address. Partition the range of attribute values seen in the full trace into a number I of bins, with $n_i$ values falling in bin i, there being $n = \Sigma_{i=1}^{I} n_i, \ldots, n_i$ packets in total. Suppose that $m_{Ii}$ of the samples have attribute in bin i, there being $m_i = \Sigma_i m_{1i}$ samples in total. Likewise, there are $m_{oi} = n_i - m_{Ii}$ unsampled packets in bin i, with $m_{oi} = n - m_I$ unsampled packets in total. We form the 2by-I contingency table of bin occupancies shown in Table 1.

The chi-squared statistic for Table I is $$T = \sum_{i=0}^{i} \sum_{j=1}^{j} \frac{(m_{ij} - \overline{m}_{ij})^2}{\overline{m}_{ij}} \qquad (7)$$

TABLE 1

2-by-I table of bin occupancies.

| | | | | |
|---|---|---|---|---|
| $m_{01}$ | $m_{02}$ | ... | $m_{0I}$ | $m_0$ |
| $m_{11}$ | $m_{12}$ | ... | $m_{1I}$ | $m_1$ |
| $n_1$ | $n_2$ | ... | $n_I$ | $n$ | where $\overline{m}_{ij} = m_i n_j/n$ is the expected values of mij under the null hypothesis that the bin occupied by a given packet is independent of whether or not it is sampled. For a given confidence level c (say c=95%), we accept this hypothesis if $T<T_c$, the $c^{th}$ quantile of the chi-squared distribution with I−1 degrees of freedom. Equivalently, we accept if C(T)<c, where the C is the cumulative distribution function of the chi-squared distribution with I−1 degrees of freedom. Chi-squared and related statistics were evaluated as discrepancy metrics for sampled network traffic as taught by others; Vern Parson discusses optimization of bin sizes for ordinal data such as inter-event times. We applied three variants of this procedure in order to test the independence hypothesis.

Figure 5A:
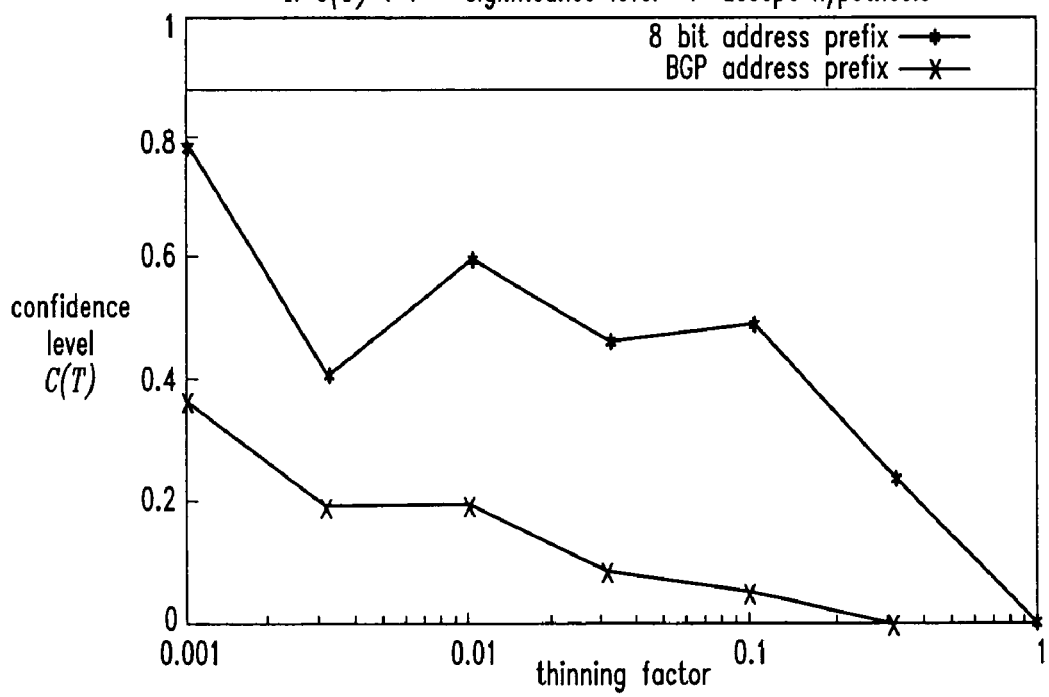
FIG. 5A shows a graph of confidence levels from chi-squared statistics of sampled address distributions as a function of a thinning factor.

Referring to FIG. 5A: HASH-SAMPLED ADDRESS DISTRIBUTIONS, confidence levels C(T) from chi-squared statistics of sampled address distributions are plotted as a function of thinning factor. In all cases, the sample distribution is consistent with that of full trace down to an 80% confidence level. The sampling hash is calculated based on a 40 byte packet prefix.

Packets are binned based on address prefix. The sampling hash is calculated using a 40 byte packet prefix. Increasing the packet prefix for the sampling hash beyond this point does not decrease the frequency of collisions (see FIG. 4), so there should be no further reduction in dependence between sampling hash and packet address.

The experiments reported here used a fixed length 8-bit prefix, yielding $I=2^8$. We amalgamated bins i with expected occupations $\overline{m}_{1,i} < 1$ in order to avoid under-emphasizing contributions to T, which could otherwise lead to optimistic acceptance of the null hypothesis. Treatment of small expected occupations is discussed by Lothar Sachs, *Applied Statistics*, Section 4.3, Springer, 1984. Of 80 bins occupied in the full trace, nearly half remained occupied at a thinning factor of $10^{-3}$. FIG. 5 shows C(T) as a function of the thinning factor r/A using modulus A=16979. In all cases, C(T) was less than 0.8; thus the sampled and full trace address distributions cannot be distinguished at 80% or higher confidence level.

We repeated the experiments for two other binning schemes (i) fixed length 16 bit address prefixing; and (ii) BGP address prefixing in which addresses are allocated to bins according to their longest prefix match on a snapshot of the BGP routing table. In both these cases there were roughly 1000 bins occupied by the full trace. The confidence levels C(T) were lower than those reported above, i.e., the independence hypothesis would be more readily accepted.

Figure 5B:
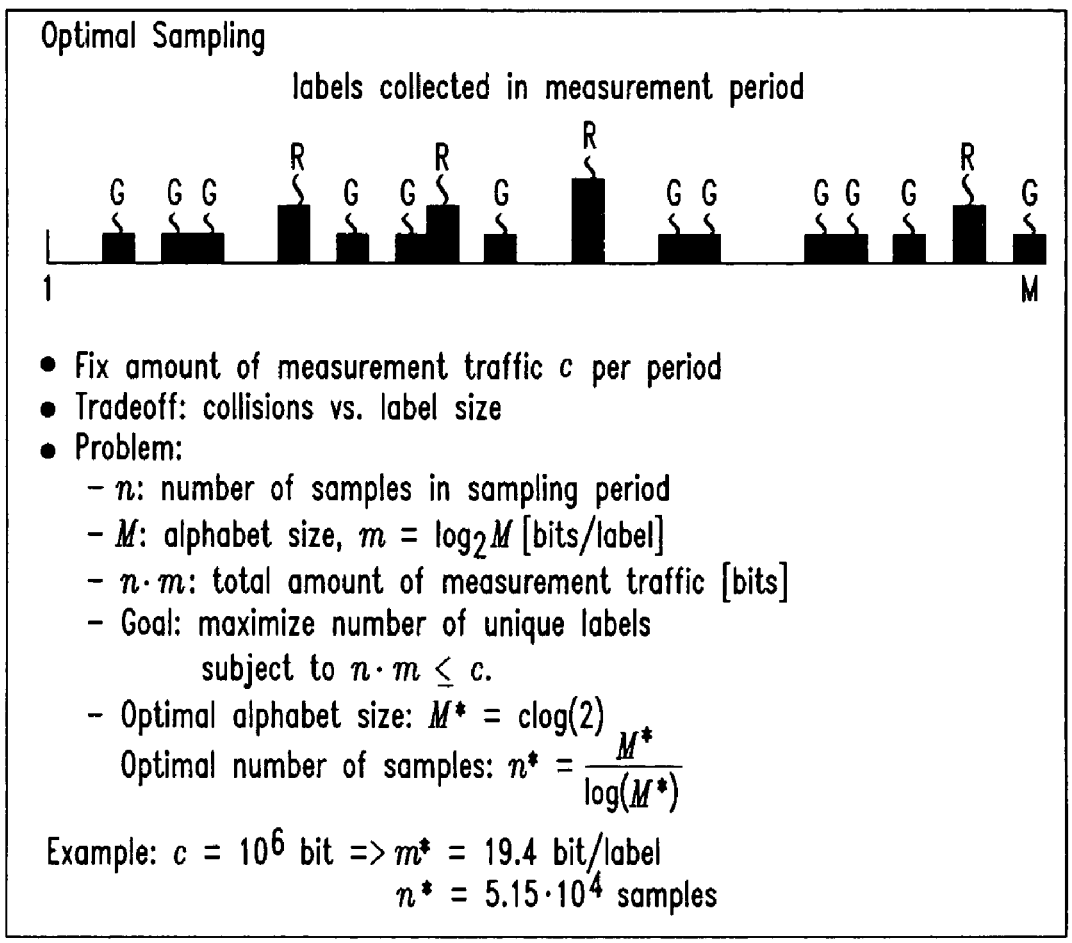
FIG. 5B shows a plot of the frequency of labels reported over a measurement period useful in resolving ambiguities.

Referring to FIG. 5B, there is shown an example of plotting differed label receipt instances over a measurement time received for all sampled packets. This shows, for example, each instance of a label demoted between label 1 and M. When two instances of a label are reported, this shows a collision. Green G, single instances, are good; red R, multiple instances, are bad.

Referring to FIG. 6: HASH-SAMPLED ADDRESS BITS DISTRIBUTIONS, a quintile-quintile plot of address bit chi-square values vs. chi-squared distribution with one degree of freedom, for various traces, primes A, thinning factors r/A is shown. Close agreement for 40 byte packet prefixes; marked disagreement for 20 byte packet prefixes (i.e. no payload included for sampling hash)

Let $x_k$ denote the $k^{th}$ packet in a stream, and $x_k(l)$ its $l^{th}$ bit. For each bit position l we construct the 2-by-2 contingency table in which $m_{ij}$ is the number of packets k for which the sample hash $h(\phi(x_k))=i$ and the $i^{th}$ bit is $x_k(l)=j$. We calculated the corresponding chi-squared statistic T for each address bit, using each of two traces, three distinct primes A=1013, 10037 and 16979 and thinning factors r/A between approximately $10^{-1/2}$ and $10^{-4}$, all hashing on a 40 byte packet prefix. According to the null hypothesis, each such T should follow a chi-square distribution with 1 degree of freedom. We summarize these statistics in FIG. 6 through a quintile-quintile plot of the T values against this chisquare distribution. This shows close agreement; the plot is similar to that obtained using randomly generated statistics from the expected distribution. For comparison we also show quintiles obtained with a 20 byte packet prefix, i.e., using only the invariant header for sample hashing. In this case there is poor agreement, with many high T values, presumably due to the increased frequency of collisions.

For a trace of a single ftp session between two hosts, we check that the packet sample process is consistent with that of independent sampling at the average sampling rate. We allocate packets into one of two bins, according to whether the succeeding packet in the session is sampled or not. This results in a 2-by-2 contingency table in which $m_{ij}$ is the number of packets k for which the sample hash $h(\phi(x_k))=i$ while that of its successor is $h(\phi(x_{k+1}))=j$. According to the null hypothesis, the statistic T follows a chi-squared distribution with 1 degree of freedom. We performed a number of experiments using A=2377, thinning factors between $10^{1/2}$ and $10^{-4}$, and packet prefixes of 50 bytes or larger. In each experiment we were able to accept the hypothesis at the 95% confidence level.

We next discuss the choice of the number of samples n and the number of bits m per sample. For convenience, we let $M=2^m$ denote the alphabet size of the identification hash.

Based on the discussion of ambiguity above, if two different trajectories happen to use the same label, then they may or may not be ambiguous. The probability that we get an unambiguous sample of a trajectory depends on the statistical properties of all the other trajectories that might interfere. This is difficult to analyze. However, we are able to obtain a lower bound on the number of unambiguous labels. For this purpose we assume that the label subgraph is ambiguous whenever there is a label collision. In other words, we disregard the cases discussed in FIG. 3, where several trajectories with the same label can be ambiguous.

We obviously face two conflicting goals for the choice of n and m. On the one hand, the reliability of traffic estimates increases with the number of unambiguous samples we can collect. On the other hand, we have to limit the total amount of measurement traffic between the routers in the domain and the collection system. Note that the amount of traffic incurred over a measurement period is given by nm bits, because an m-bit label is transmitted to the collection system for each of the n samples (ignoring packet headers for the measurement packets and other overhead).

We therefore formulate the following simple optimization problem: we want to maximize the expected number of unique (unambiguous) samples, subject to the constraint that the total measurement traffic nm must not exceed a predefined constant c. We assume that each sample independently takes one of the M label values with uniform probability $p=1/M$. The marginal distribution of the number of samples taking a given label is binomial $B(n,p)$. Hence the probability that the label is generated exactly once in the domain with the measurement period is $$p_u = np(1-p)^{n-1} \quad (8)$$

Let $Z_i$ be the random variable that takes the value 1 if label i is taken by exactly 1 sample, and 0 otherwise. The mean number of unique samples is then $$A(n,m) = E\left[\sum_{i=1}^{M} Z_i\right] = \sum_{i=1}^{M} E[Z_i] = Mp_u = (n(1-p)^{n-1}) \quad (9)$$

where E denotes the expected value under the assumed uniform label distribution. For fixed n, $A(n, m)$ is obviously maximized for $m=c/n$, and we therefore maximize $$A(n) = n(1 - 2^{-c/n})^{n-1} \quad (10)$$

Solving $A'(n)=0$ yields the maximizing $n^*$, where $A(n)$ is the derivative of $A(n)$, $$A'(n) = (1 - 2^{-c/n})\left[1 - 2^{-c/n}\left(1 + \frac{n-1}{n}c\log(2)\right)\right] = 0.$$

For the trivial solution $n=c$, $A(n)$ less than O. We find the solution to be $$n^* = \frac{M^*}{\log(M^*)^1}, \quad M^* = c\log(2) \quad (11)$$

Finally, we compute the sample collision probability at the optimal operating point.

$$p_{coll} = 1 - \frac{A(n^*)}{n^*} = 1 - (1 - 2^{-c/n^*})^{n^*-1} \approx 1 - e^{-\frac{1}{m^*\log(2)}} \quad (12)$$

FIG. 7 illustrates how $n=n^*$ maximizes $A(n)$: for $n<n^*$, collisions are very rare—we waste label bits for too few samples; for $n>n^*$, collisions are too frequent—we waste samples through collisions because label identifiers are too short. Note that the optimal $M^*$ can obviously not be achieved exactly. In practice, we choose the largest integer $B<M^*$ satisfying the conditions put forth in Section 3.1.0

Referring to FIG. 7: THE EXPECTED NUMBER OF UNIQUE SAMPLES $A(n)$ AS A FUNCTION OF n, FOR C=106 BIT. The optimal number of samples $n^*$ is approximately 5.15. 104, with $m^*=19.4$ bit per label. The Collision probability $p_{coll}$ is approximately 0.072, i.e., 7.2% of the samples transmitted to the collection system have to be discarded.

Let us look at a specific example that illustrates how m and n would be chosen in practice. Assume that the measurement domain consists of 100 OC-192 links (10 Gbps each). Suppose the measurement system can handle 10 Mbps of incoming label traffic for the entire domain. (We do not discuss distributed implementations of the measurement collection system, but the potential of distributed measurement processing to increase the amount of measurement traffic is obvious.) Furthermore, we choose a measurement epoch to be T=10 seconds; this is a conservative upper bound on the lifetime of a packet traversing the domain. For simplicity, we assume that all packets are 1500 bytes long.

The bound on the total amount of measurement traffic is $c=T \times 10=1e8$ bits. The number of samples we should collect over the measurement period is $n^*=3.84e6$, or about 3840 samples per link per second. A fully loaded OC-192 link can carry about 833 k 1500-byte packets per second. Therefore, we would configure the sampling hash in this domain so that the sampling probability for a packet would be approximately $3840/8.33e5 \sim 1/217$. The labels would be $m^*=\log,(M^*)P:\sim 26$ bit long. The actual number of samples n will obviously depend on how heavily each link is loaded. The main point of the above analysis is to allocate enough bits m to labels such that under peak load, the collision probability does not become too frequent. Note that if the average packet size is less than 1500 bytes, we simply have to reduce the sampling probability accordingly (e.g., by reducing r). However, the number of samples $n^*$ and the label size $m^*$ are not affected, as they depend only on c.

Traffic Measurement

In this section, we use trajectory sampling for a simple measurement task. The goal of this experiment is to illustrate how estimators can be constructed based on the sampled labels received from the measurement domain. We study the following simple scenario. Assume that a service provider wants to determine what fraction of packets on a certain backbone link belongs to a certain customer. To estimate this fraction, the service provider can use the labels collected from the backbone link under study and from the access link(s) where the customer connects to the network.

For the purposes of experimentation, we adapt the packet trace used in the previous section to the present context as follows. All packets with a certain source prefix are designated as originating from the customer, while the remaining packets form the other traffic on the backbone link.

Referring to FIG. 8: MEASUREMENT EXPERIMENT, there is shown a simple experiment where labels from two links are compared to estimate what fraction of traffic on the backbone link comes from the customer access link.

For the sake of exposition, assume that we sample packets and collect labels only from the customer access point, and from the backbone link. We then proceed as follows: any label that appears more than once on the backbone link is discarded, because this can only be due to a collision. Among the remaining unique labels, we determine which labels are only observed on the backbone link, and which labels are observed on both links. This allows us to obtain an estimate for the fraction of customer traffic on the backbone link, given by $$\hat{\mu} = \frac{n_{c,b}}{n_b}, \tag{13}$$

where $n_{c,b}$ is the number of unique labels observed on both the customer access link and on the backbone link, while $n_b$ is the total number of unique labels observed on the backbone link. Note that $n_b<n$ because of collisions; $E[n_b]=A(n)$.

Figure 9:
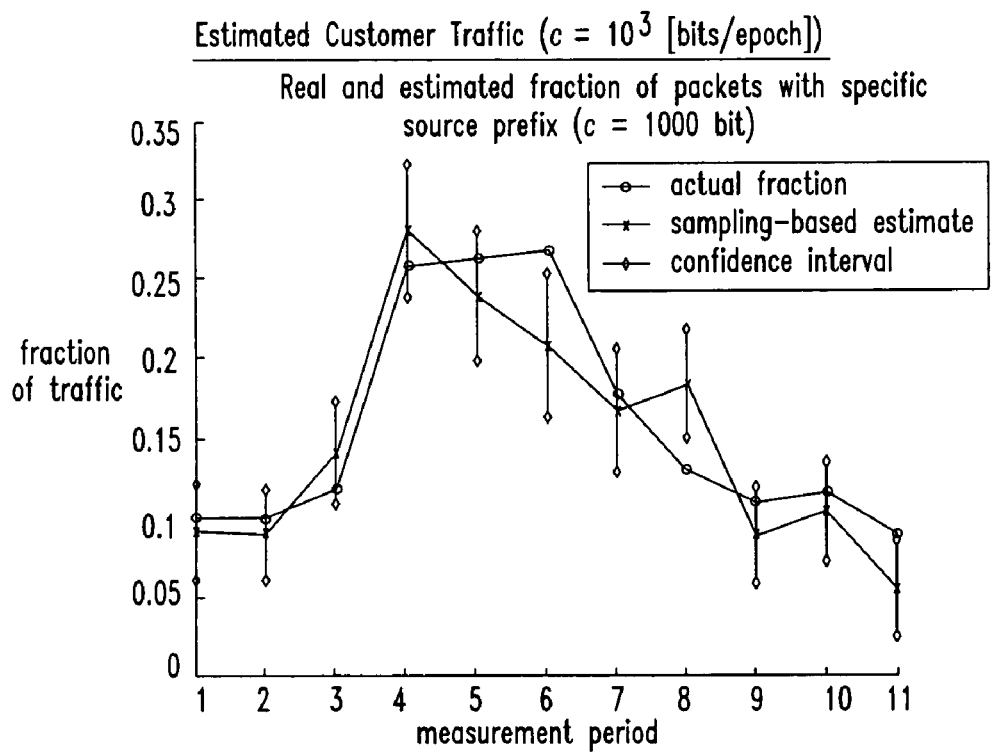
FIG. 9 shows a plot of real versus estimated customer traffic showing the accuracy of the trajectory sampling as described.

Referring to FIG. 9: REAL AND ESTIMATED FRACTION OF CUSTOMER TRAFFIC. For c=1000 bit for this link (M'=693.1, B=691, n*=106).

Figure 10:
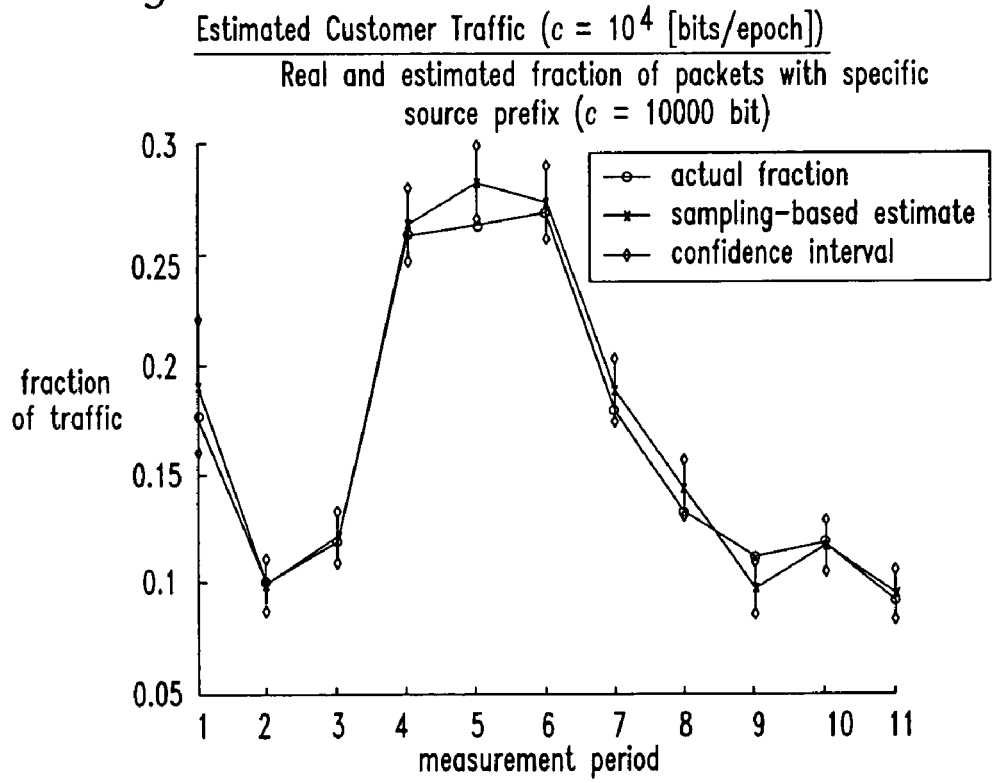
FIG. 10 shows another plot of real versus estimated customer traffic.

FIGS. 9 and 10 compare the estimated and the actual fraction of traffic on the backbone link, for ten consecutive measurement periods. For simplicity, we have defined a measurement period as a sequence of $10^5$ consecutive packets in the trace, rather than as a time interval. The graph also shows confidence intervals around the estimated values. The confidence intervals are obtained as follows. We compute the standard deviation of the estimator $\hat{\mu}$ assuming that each packet gets sampled independently and with equal probability. If this were true, then the probability that a sampled packet belongs to the customer μ. The variance of a Bernoulli random variable with mean p is p(1−P). The standard deviation of the estimator $\hat{\mu}$ is then $$\sigma = \sqrt{\frac{\mu(1-\mu)}{n_n}} \tag{14}$$

The confidence interval we plot is $[\hat{\mu}-\sigma,\hat{\mu}+\sigma]$, i.e., one standard deviation around the estimated value.

Note that the amount of measurement traffic per measurement period from the backbone link (c=nm) is quite small (1000 bits in FIG. 9 and 10 kb in FIG. 10). The confidence interval is reduced as the amount of measurement traffic increases.

A statistical estimator such as the one considered here relies on an underlying random sampling process. The size of the confidence interval is then a consequence of the central limit theorem for independent random variables. However, trajectory sampling is based on a deterministic sampling process, and the sampling decision for a packet is a function of this packet's content. Nevertheless, we observe in this experiment that the true value of the estimated quantity lies within or very close to the confidence interval without exception. This is despite the fact that there is strong correlation between the packet content (because the customer packets all have the same source prefix) and the events we are counting (packet belongs to customer). This correlation does not translate into a biased sampling process here. This demonstrates that good hash functions can sufficiently "randomize" sampling decisions such that the set of sampled packets (and their labels) are representative of the entire traffic for the purpose of statistical estimation.

Referring to FIG. 10: PEAL AND ESTIMATED FRACTION OF CUSTOMER TRAFFIC, for c=10 kbit for this link (M*=6931.5, B=6917, n*=782).

Discussion of Implementation Issues

The implementation cost for trajectory sampling is quite acceptable even for the highest interface speeds available today. Trajectory sampling requires a device for each interface capable of (a) computing the sampling hash and making a sampling decision, and (b) computing the identification hash for the sampled packets.

The computational cost is obviously dominated by the operations that have to be executed for each packet that goes through this interface (as opposed to operations only on sampled packets). In our conceptual description of the sampling process, we have viewed computation of the sampling and the identification hash as sequential. The identification hash would only be computed if the packet is to be sampled, otherwise the packet is discarded. However, from an implementation point of view, this is undesirable, as it would require buffering each packet until the sampling hash is computed.

Figure 11:
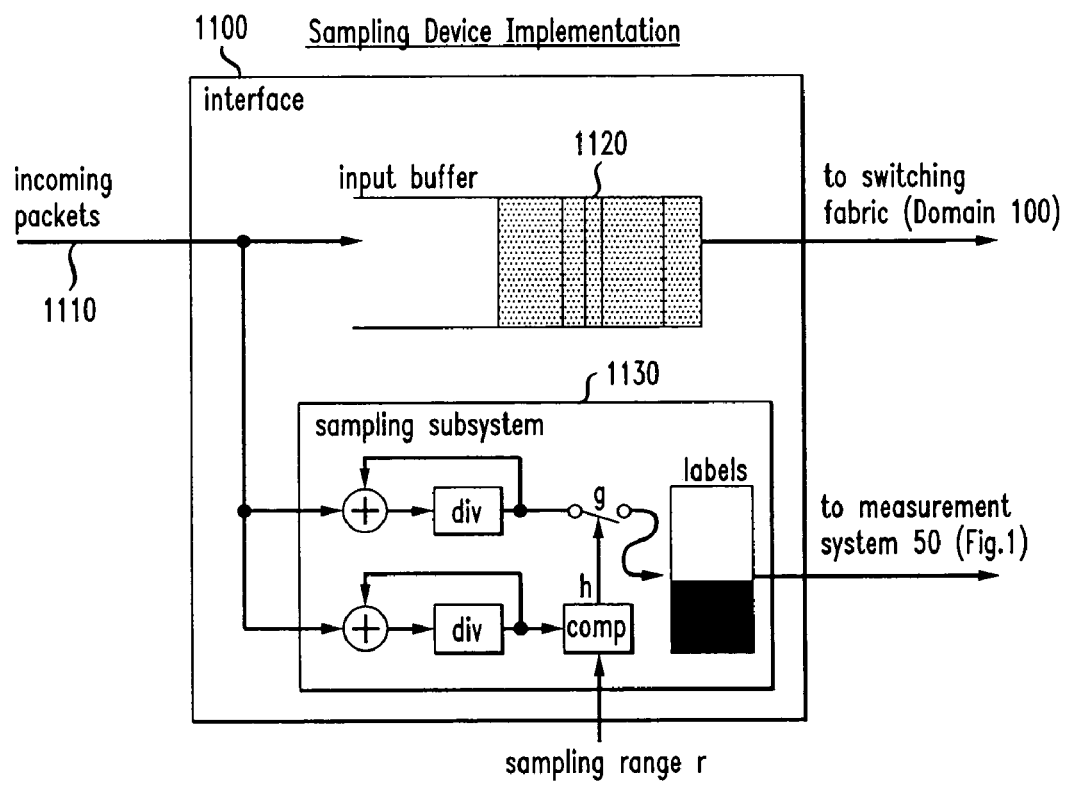
FIG. 11 shows a functional schematic block diagram of apparatus that may be provided at a traffic switch point to hold incoming packets, apply a sampling function and generate a label for sampled packets so that further parameters may be determined and stored at a measuring system.

An alternative implementation is illustrated in FIG. 11. A possible implementation of trajectory sampling computes both the sampling and the identification hash concurrently and on the fly. This removes the need to make a separate copy of each packet. The computation of the two hashes, defined in equation (6), can be implemented with the elementary multiply-and-add (resp. divide-and-add) function supported in off-the-shelf DSPs. A small buffer labels, analogous to label table 45 in FIG. 1, stores labels before they are copied into an IP packet and sent to the collection system 50. Some additional logic would be necessary on some nodes (probably on slower ingress nodes) to extract other fields of interest from a packet, e.g., length, and source and destination addresses. In one embodiment, a time-to-live field value is forwarded as a time stamp. A real time stamp or other synchronous clock stamp may also be used to indicate to a measurement system such parameters as packet delay.

The interface circuit 1100 receives incoming packets on line 1110 which are temporarily stored in input buffer 1120 for sampling before being released to the switching fabric, for example a router of domain 100. A simple sampling subsystem 1130 comprises a label generating hash function and a packet sampling hash function operative over a sampling range r. The labels and any further data are forwarded to measurement system 50. As described above, for an edge router, certain packet data parameters may be forwarded with a time stamp or a time to live field read-out and for other routers and links only the label or the label and a time stamp may be sent to measurement system 50.

Such a circuit computes both the sampling hash and the identification hash for both packets concurrently and on the fly as the bits come in on line 1110. The hash functions discussed above allow such an implementation. As explained above it is not necessary to make a separate copy of the packet for the purpose of computing the identification hash. The processor computes both hashes, and simply writes the identification hash g into the label store labels if the sampling hash h is equal to one. The label store labels accumulates packet labels until it reaches a predefined size, then preferably sends the labels to the measurement system 50 as a single IP packet. This should be done reliably (e.g., using TCP) in order to avoid loss of samples during congestion, and therefore possible bias in traffic estimators.

As an example, a state-of-the-art off-the-shelf digital signal processor can process up to about 600M 32-bit multiply-and-accumulate (MAC) operations per second. This corresponds to a raw data rate of 20 Gbps. Also, raw memory I/O bandwidth can be up to 256 bit per memory cycle, which corresponds to 77 Gbps at 300 MHz clock speed. In comparison, an OC-192 interface (the fastest commercially available SONET interface) carries 10 Gbps.

While these arguments are based on peak processor performance, which typically cannot be sustained for various reasons (such as pipeline stalls in the processor), these numbers do illustrate that the computational requirements necessary for trajectory sampling are within reach of current commodity processors. It is also interesting to note that the price of such a processor is roughly two orders of magnitude lower than that of an OC-192 interface card. Adding logic for trajectory sampling to high-speed interfaces would therefore be comparatively cheap. Also note that to add measurement support to interface cards is in line with the trend over the last few years to move processing power and functionality from the router core to the interfaces.

We expect the relative cost of the sampling logic with respect to the interface hardware per se to evolve in our favor. In fact, it appears that processor performance increases slightly faster (doubling every 18 months according to Moore's law) than maximum trunk speed (doubling every 21 months) [21]. If these trends persist, then the cost of incorporating trajectory sampling into the next generations of high-speed interfaces can be expected to be negligible.

The link sampling device also requires a simple management interface to enable/disable packet sampling, to tell the device where to send measurement traffic, and to set the parameters of the hash functions. A simple SNMP MIB, indexed by the IP address of the interface, could fulfill this function.

Several common measurement approaches for IP networks may be put them into perspective in light of the points made above. There are two general classes of measurement approaches. Aggregation-based approaches are deterministic functions of the observed data. They usually compute the sum or the maximum of some metric over the dataset (e.g., the sum of packets traversing a link during an interval, or the maximum end-to-end roundtrip delay for a set of packets). Sampling-based approaches extract a random subset of all of the possible observations. This sample subset is supposed to be representative of the whole. The law of large numbers asserts that reliable estimators of desired metrics can be constructed from these samples. The first two methods we discuss, links measurements and flow aggregation, are aggregation-based. The third method, end-to-end probing, are sampling-based.

In a link measurements (aggregation-based, direct) approach, aggregate traffic statistics are measured on a per-link basis, and are reported periodically (e.g., every five minutes). Metrics typically include the number of bytes and packets transferred and dropped within a reporting period. Some of these statistics are defined as part of the SNMP (Simple Network Management Protocol) MIBs (Management Information Base).

The limitation of this approach is that some information is lost in the aggregation; therefore, it does not allow classification of the traffic (e.g., by protocol type, source or destination address etc.). More importantly, it is not possible in general to infer spatial traffic flow, i.e., to infer what path(s) the traffic follows between an ingress and an egress point. As such, this approach is better suited to detect potential problems, manifesting itself through link congestion, than to actually analyze the problem and modify routing information to remedy it.

In a flow aggregation (aggregation-based, indirect) approach, one or several routers within the domain collect per-flow measurements. A flow comprises a sequence of packets with some common fields in their packet header and which are grouped in time. The router has to maintain a cache of active flows. For some router models, flow caches already exist to speed up route and access control list (ACL) lookup. A flow record may include specification of the source and destination IP address and port number, flow start-time, duration, the number of bytes and packets, amongst others.

One disadvantage of flow aggregation is that the amount of measurement data can be considerable; the traffic generated can impose a significant additional load on the network. This is especially true in the presence of large numbers of short flows, such as http-get requests. Also, the measurement traffic is hard to predict. It depends heavily on the way the router identifies individual flows, which in turn depends on various control parameters (such as the degree of aggregation of source and destination addresses), the traffic mix (protocols), and the cache size. A further complication may arise if traffic measurements are to be used for real-time control functions. Since a flow record is usually generated only upon a flow's completion, this implies that an on-line statistic may miss a long-lived flow that has not yet terminated.

A full path matrix over the domain can be obtained if flow aggregation measurements are available at each ingress point and if we know how the traffic is routed through the domain. While this is currently the only approach we are aware of to obtain a full traffic matrix in IP networks, it has several drawbacks:

emulation of routing protocols: even for non-adaptive routing, we have to rely on emulation of the routing protocol to correctly map the ingress traffic measurements onto the network topology; this requires full knowledge of the details of the routing protocol as well as its configuration.

no verification: as mentioned before, one important role of traffic measurement is in the verification and troubleshooting of routing protocols and policies; obviously, routing emulation precludes detecting problems in the actual routing, e.g., due to protocol bugs.

dynamic and adaptive routing: dynamic routing (routing around failed links) or adaptive routing (load balancing across multiple links/paths) further complicates emulation, because precise link state information would have to be available at each time (note that widely used routing protocols such as OSPF have some provisions to balance load among several shortest paths in a pseudo-random fashion; this would be impossible to emulate exactly).

In an active end-to-end probes (sampling-based, indirect) approach, hosts (endpoints) connected to the network send probe packets to one or several other hosts to estimate path metrics, such as the packet loss rate and the roundtrip delay. In a variation of this approach, hosts do not actually generate probe packets, but they collect and exchange measurements of the traffic of a multicast session (e.g., RTCP).

This approach gives direct measurements of end-to-end path characteristics, such as round-trip delay and packet loss rate; per-link characteristics have to be inferred. This approach can be viewed as an alternative way to obtain per-link aggregate measurements. Its advantage is that it does not require any measurement support from the network. It has the same disadvantages as the "link measurement" approach.

Trajectory sampling according to the present invention differs from the above approaches in that it relies on a sampling hash function to select a statistically representative subset of packets over all the flows traversing the network. This is because there is a strong correlation between some fields in the packet (e.g., the destination address) and the path taken by the packet. The focus of trajectory sampling is to directly observe the entire traffic flowing through a domain, rather than a single flow at its endpoints, and to infer statistics on the spatial flow of this traffic.

Extensions and Other Applications

Distributed Denial-of-Service Attacks (DDoS) flood a network or a host with bogus traffic with the intent of breaking down service to legitimate clients. Attackers often use packet spoofing, i.e., using false source addresses, to evade detection and exacerbate the impact of the flood. Because of this, it is difficult to identify the real source(s) of the attacking traffic, because there is no a-posteriori information available to deduce where a packet entered the network and what path it followed. The method presented in this paper may help in the detection of such an attack, as sample trajectories provide the actual paths packets are taking to reach the targeted system despite the fake source address.

Filtering permits the application of trajectory sampling only to a subset of the traffic in a domain. For example, a network operator might want to examine only the traffic destined for a particular customer, or only the traffic of a certain service class. The amount of measurement traffic can be reduced in such a situation if only the traffic matching the desired criterion is sampled. This can be achieved by preceding the sampling device above in reference to FIG. 11 with a configurable packet filter. The network operator could then configure the filters of all the interfaces in the network to sample only the desired subset of traffic. This could again be achieved through the sampling device's SNMP MIB.

In a network domain which supports trajectory sampling, it is possible to probe end-to-end routes using probe packets in a novel way. Assuming that the sampling and identification hash functions in the domain are known, it is possible to construct packets that will be sampled as they traverse the network. Suppose we wish to check the path of a packet with a given header between a specific ingress and egress node. We can then append a payload to this header that forces the sampling of this packet, by selecting the payload such that $h(o(x))=1$. The label for this packet can also be determined. This method could be used to verify specific routes for debugging or for monitoring purposes.

Trajectory sampling may also be applied to higher level objects besides packets. Trajectory sampling may be applied in an e-mail system or to flows as defined above. For example, when there exists an overlay network such as and e-mail network in which mail forwarded along a chain of mail hosts between source and destination, the trajectory of an e-mail message comprises the set of e-mail hosts which the e-mail message passes through. All the principles of trajectory sampling discussed above at the packet level can be applied at an e-mail message level. That is, messages contain an invariant section such as the message identifier set by the sender that can be used as input to a sampling function that is executed by mail hosts in order to determined whether a message will be sampled. Other examples of overlay networks in which trajectory sampling may be applied in accordance with the present invention include proxy networks for forwarding http requests and web cache networks for distributing web content, sometimes referred to as web content distribution networks.

Trajectory sampling may likewise be applied to packet flows. Packet flows observed at a node typically are sufficiently close in time sequence and have a common identifiable property. This property is likewise invariant and so amenable to trajectory sampling. For example, a set of packets with common source and destination IP addresses and port addresses, with interpacket time not exceeding a certain threshold, may be identified as a packet flow.

Finally, suppose we remove the constraint on direct sampling techniques that the measurement domain and the protocol need not remain constant. For example, the protocol may change or a packet may be encapsulated with a new header permitting redefinition. It has already been suggested above that an IP version header has a most significant bit position that really does not provide any information. If four bits are permitted for such a header and we are not at version 6, it may be years before we reach version nine when the most significant bit position will b used. Consequently, this bit position may be used as a predetermined bit position and sampling flag when set to tell a sampling station that it has been selected for sampling. Similarly, via router design, encapsulation in a new header with a sampling flag bit may be similarly used. This embodiment type of alternative trajectory sampling will be denoted herein a sampling flag embodiment.

Thus, we have proposed a method for the consistent sampling of packet trajectories in a network. Only a subset of packets are sampled, but if a packet is sampled at one link, it will be sampled on every other link it traverses. On traversing the network, each packet implicitly indicates whether or not it should be sampled through its invariant part, i.e. those bits that do not change from link to link. A hash of these bits it calculated at each router, and only those packets whose sampling hashes fall within a given range of values are selected. For identity on the packet. This is communicated by the sampling router to the measurement systems. This enables post sampling analysis of distinct trajectories once the samples are reported. The method has a number of desirable properties: Simple Processing: the only per packet operations required are the division arithmetic on a small number of bytes in the packet header. No packet classification or memory lookups are used.

No Router State is required in the per packet processing of the router: packets being processed individually. No caching is required in the measurement subsystem of the router, thus avoiding cache delay and possible biasing through the requirement of cache expiry policies. This does not exclude the possibility of having state in the reporting system in the router, it may be desirable to aggregate discrete reports to the measurement system rather than sending them individually.

Packets are directly observed: the course of the packets through the network can be determined without a network model that specifies how they ought to be routed. This is important for debugging since routing may not easily specify current routing state of the system. Moreover, configuration or other errors may cause actual routing behavior to deviate from that specified by the model.

Hash functions that satisfy stronger randomization properties should be further investigated and trajectory sampling evaluated in a network context. The aims are to understand trajectory reporting over a wide network, and to develop techniques for systematic trajectory reconstruction, including resolution of ambiguities of the type discussed with reference to FIG. 3. The approach combines routing information and traffic traces to make a network simulation that captures the topology and traffic patterns of real networks.

Thus there have been shown and described preferred embodiments for trajectory sampling of packets and multiples of packets which may be applied in practically any type of packet switching network, including, by way of example, the Internet. We have characterized these as the sampling and label generating embodiment and the sampling flag embodiments but hybrids and derivatives of these and the choices of what data to forward to a measurement system in accordance with what trajectory sampling method is applied may comprise other aspects of the present invention which should only be deemed to be limited by the scope of the claims which follow.

What we claim is:

1. A method of sampling internet protocol traffic over links of an internet protocol network comprising the steps of
sampling packets at network traffic points as a function of an internet protocol packet content, and
generating a packet label for each sampled packet;
said function dependent upon substantially invariant data of a packet, said substantially invariant data excluding at least one of a service type field, a header checksum, a version field, and a header length field.

2. A method as recited in claim 1 wherein said packet comprises said internet protocol packet content.

3. A method as recited in claim 1 wherein said invariant data of said packet includes at least high entropy data fields.

4. A method as recited in claim 1 wherein said invariant data excludes at least variable fields.

5. A method as recited in claim 1 wherein said invariant data further excludes a service type field, a header checksum, a version field, and a header length field.

6. A method as recited in claim 1 wherein said invariant data further includes a low entropy data field.

7. A method as recited in claim 1 wherein said packet label has a length determined to be as small as possible consistent with avoiding a collision with a similarly labeled packet during the expected period a sampled packet takes to traverse the network.

8. A method as recited in claim 1 wherein said applied packet label comprises between 16 and 24 bits.

9. A method as recited in claim 1 further comprising the step of transmitting said generated label to a measurement system.

10. A method as recited in claim 9 further comprising the step of multiplying the number of packet samples and the number of bits per sampled packet at a measurement system.

11. Apparatus for sampling internet protocol traffic over links of an internet protocol network at network traffic points comprising:
a processor for computing a sampling function, responsive to the sampling function, for determining packets to be sampled, and for generating a label for each sampled packet;
said sampling function dependent upon substantially invariant data of a packet, said substantially invariant data excluding at least one of a service field, a header checksum, a version field, and a header length field.

12. Apparatus as recited in claim 11 further comprising a packet buffer for temporarily holding packets during sampling.

13. Apparatus as recited in claim 11, said processor providing an output to a measurement system of labels for only sampled packets.

14. Apparatus as recited in claim 11 wherein said packet comprises said internet protocol packet content.

15. Apparatus as recited in claim 11 wherein said invariant data of said packet includes an invariant data field.

16. Apparatus as recited in claim 11 wherein said invariant data excludes a variable data field.

17. Apparatus as recited in claim 11 wherein said invariant data further excludes a service type field, a header checksum, a version field, and a header length field.

18. Apparatus as recited in claim 11 wherein said invariant data further includes a low entropy data field.

19. Apparatus as recited in claim 11 wherein said packet label has a length determined to be as small as possible to avoid collisions with packets having a similar label within the expected period a sampled packet takes to traverse the network.

20. Apparatus as recited in claim 11 wherein said applied packet label comprises between 16 and 24 bits.

21. Apparatus as recited in claim 11 further comprising a data transmitter for transmitting a plurality of labels and data to a measurement system as an IP packet.

22. Apparatus as recited in claim 11 said processor multiplying the number of packet samples and the number of bits per sampled packet.

23. A method of sampling switched packet traffic over links of a packet switching network at network traffic points comprising selecting packets for sampling in accordance with a predetermine sampling function at an edge router,
altering a predetermined bit position of a packet that is at least practically invariant as a sampling flag to demark a packet selected for sampling.

24. A method as recited in claim 23 wherein said altered bit comprises a bit of a protocol version field.

* * * * *